United States Patent Office 3,271,332
Patented Sept. 6, 1966

3,271,332
SILOXANE FOAM
Herbert M. Bond, Stillwater Township, Washington County, and Jun Tomita, St. Paul, Minn., assignors to Minnesota Mining and Manufacturing Company, St. Paul, Minn., a corporation of Delaware
No Drawing. Continuation of application Ser. No. 144,856, Oct. 13, 1961. This application Dec. 7, 1964, Ser. No. 416,605
8 Claims. (Cl. 260—2.5)

This application is a continuation of our application Serial No. 144,856, filed October 13, 1961, which latter is a continuation-in-part of our application Serial No. 775,704, filed November 24, 1958, both now abandoned.

This invention relates to siloxane structural foams, and more particularly to fluid siloxane compositions capable of autogenous foaming and curing under room temperature conditions to form flexible, resilient, tough, cellular structural products. This invention also provides conveniently handled package-articles of separated components for making our compositions, permitting easy handling of our compositions in commerce and in practical use applications.

The liquid compositions of this invention are particularly useful in applications where a protective heat- and cold-resistant, insulating or shock-absorbing cellular structure is to be formed in difficultly accessible locations where the application of forming or curing heat in fabrication would be commercially impractical. As an illustration, our compositions may be used to provide shock-absorbing cellular layers between batteries and metal-frame housings therefor, without the necessity for using heavy molding apparatus and without the necessity for applying external heat to the entire structure to gain proper spreading and foaming of the composition. Our fluid may simply be poured in place using crude or temporary panels to guide and hold the fluid in position while it simultaneously foams and firms up. Shock-absorbing, heat- and cold-resistant, flexible, resilient, tough, cellular layers between a battery and its frame housing may thus be conveniently formed at room temperature, in an assembly line operation, permitting considerable economy and speed in manufacturing operations.

Other types of foamable siloxanes have been known heretofore. For example, a solid pulverulent composition consisting of an organosilicon resin having a ratio of organic groups to silicon atoms of about 1.3, a silanic hydrogen compound, and a hydroxylated compound is known as a producer of foam when it is heated, e.g., to 120° C., where a reaction between the silanic hydrogen compound and the hydroxylated compound is stated to occur. Further illustrations of such foamable compositions are to be found in United States Letters Patent No. 2,833,732 issued to Dow Corning. In practice, such foamable siloxanes are supplied in solid pulverulent form, require heat for foaming and any optional curing, and are known to produce products of a generally brittle character. They shatter when bounced or thrown on the floor.

Foamable siloxanes have also been formed by using conventional blowing agents in admixture with organosilicon materials and curing agents therefor (note U.S. Letters Patent No. 2,655,485). Such compositions are normally solid, but may be dispersed in solvents to gain fluidity. However, it is necessary to remove solvents before heat triggering the blowing agent; otherwise the foam produced tends to collapse and become worthless as a structural element. Thus, there are difficulties in properly handling such compositions to achieve desired cellular structures. In addition, the resulting foam structures have been unsatisfactory for use in many shock-absorbing applications because of their brittleness and poor strength properties.

Insofar as is known, therefore, no one prior to our discovery was ever successful in providing a liquid, solvent-free, organopolysiloxane composition which would foam and cure at room temperature in autogenous manner (i.e., without requiring external aids such as heat) to provide a finely and uniformly cellular, heat- and cold-resistant, flexible, tough, and resilient foamed siloxane structural product.

We have formed cellular siloxane products which have remained flexible, tough and resilient at temperatures as high at 500° F. or more, and as low as minus 100° F. or even lower. Cellular products formed according to this invention have remained intact and unshattered even when bounced against a concrete floor immediately after being withdrawn from immersion in a bath of liquid nitrogen. No cellular siloxane product known prior to our discovery exhibits such tremendous strength properties, such tremendous resistance to shattering. The toughness of our product is somewhat analogous to the toughness of products formed of the best high molecular weight siloxane gum filled with reinforcing silica and cured.

Another property long desired in fluid solvent-free siloxane compositions, in addition to properties aforementioned, is that of adhesion to various surfaces, particularly metal surfaces. Insofar as we are aware, this property has not heretofore been attained in combination with the other properties aforenoted. The siloxane composition desirably should adhere well to surfaces over which it is applied and form a strong bond therewith upon foaming and curing. Several possible aircraft and missile structural uses for siloxane compositions require such a property in combination with flexibility, temperature-resistance, lightness in weight, strength, toughness, etc. Using the principles of this invention, compositions satisfying such requirements are now made available to the art. They exhibit high tack and adhesiveness during autogenous foaming and curing; yet they provide a resulting tough, finely and uniformly cellular, structural product which is tack-free.

As may be seen by reviewing the illustrative examples of our invention, essential ingredients of our composition have all been well-known and available for several years. It was particularly surprising, therefore, to find that amongst these well-known ingredients is an unusual combination in a particular range of concentration relationships which gives an entirely new type of result. The result is in no way predictable from prior art, and even appears contrary to what one might expect. For example, we employ a fluid organopolysiloxane in our composition in rather large amount; and while such material may be foamed, it is known to cure to a punky or cheesy state rather than a tough, resilient, strong structure. Silica fillers have been worked into organosilicon gums and are known to reinforce the same, yet we do not find the presence of silica fillers to be essential in achieving our tough structures. In fact, silica fillers when mixed with a fluid silicone gum in the large amounts sufficient to impart all necessary strength to a cured mixture of the gum, also tend to firm up ("crepe-harden") the composition before curing is accomplished; and one loses desired fluidity and pourability. Silanic hydrogen compounds have been used to react with hydroxyl compounds to make hydrogen gas available to cause foaming; yet we do not find hydroxyl compounds to be essential in achieving our result. In brief, we have been unable to find any fully satisfactory prior art theory to explain our unusual result.

Our compositions include a mixture of (1) between 60 and 80 parts by weight of a diorganopolysiloxane fluid gum having a viscosity between about 1000 and 50,000 centipoises at 25° C., and (2) between 40 and 20 parts of a benzene-soluble silicone resin composed essentially of $R_3SiO_{1/2}$ and $SiO_2$ units, where R is an organic radical and where the ratio of $R_3SiO_{1/2}$ units to $SiO_2$ units is between about 0.7 and 0.96. They also include (3) a silanic hydrogen compound, preferably fluid, in an amount sufficient to give between 0.017 to 0.17 part by weight of silanic hydrogen, calculated as the weight of the hydrogen alone, for every 100 parts total of the mixture of gum and resin. In addition, for every 100 parts total of gum and resin, there is included (4) between 0.1 to 2 parts by weight of a basic vulcanization catalyst active to split off silanic hydrogen from its attachment to a silicon atom of the silanic hydrogen compound. (5) Organic silicates in an amount up to about 5 parts for every 100 parts of gum and resin may be included and effect further improvement of the strength and firmness of a foam structure formed from our composition. Also, (6) up to about 20 parts of inorganic fillers for every 100 parts of gum and resin may be used to gain improvements in the resistance to high temperature aging exhibited by the foamed structures hereof.

The low viscosity diorganopolysiloxane fluid gums (1) useful in forming our composition are essentially linear, essentially free of hydroxyl end-blocking, and have the general formula $$R_nSiO_{\frac{4-n}{2}}$$

where R is a monovalent organic radical and $n$ has an average value of about 1.9 to 2.1. At least 85% of the R groups in the fluid gum must be methyl; and the amount of methyl is preferably 90% or more. Illustrative optional monovalent organic radicals which may also be present in the fluid gum are alkyl radicals (e.g., ethyl and propyl), aralkyl radiacals (e.g., benzyl), aryl radicals (e.g., phenyl, xenyl, and naphthyl), alkaryl radicals (e.g., tolyl and xylyl), cycloaliphatic radicals (e.g., cyclohexyl and cyclopentyl), alkenyl radicals (e.g., vinyl and allyl), halogenated monovalent hydrocarbon radicals (e.g., chloromethyl, and alkoxy radicals (e.g., methoxy and ethoxy), etc. Preferably the amount of aralkyl, aryl, alkaryl and cycloaliphatic radicals in the gum will not exceed 10% of the R groups; and the amount of alkenyl preferably is not in excess of 2% of the R groups. Groups other than those aforementioned may be present in small amount in these fluid gums without upsetting the required performance properties of our composition. Our fluid gums, however, are essentially free of hydroxyl termination or hydroxyl end-blocking. They are essentially free of hydroxyl groups as such and essentially free of the occluded water frequently found in hydroxyl gums because of their method of preparation. Known hydroxyl end-blocked gums appear to exhibit relatively poor stability on heating after a period of time at elevated temperatures around 400–500° F.

Useful fluid gums for the compositions hereof may be prepared by such well-known methods as the alkali (e.g., potassium hydroxide) catalyzed polymerization of cyclic siloxanes (e.g., octamethyltetrasiloxane with or without methyl phenyl cyclic siloxanes, methyl vinyl cyclic siloxanes, etc.) in a dry atmosphere such as nitrogen at temperatures of from 50° C. to about 180° C. until the desired viscosity is reached. Polymerization may be stopped by destroying the remaining alkali hydroxide by introducing carbon dioxide, or by adding a small amount of finely divided silica to adsorb and inactivate remaining alkali hydroxide. Removal of unreacted constituents may be accomplished by distillation. Various other well-known methods of preparing liquid gums useful in practicing our invention may be employed; and the foregoing is merely offered as an illustration. As may be observed, no particular step in the method of preparation is devoted to obtaining accurately controlled and uniform end-blocking groups in the linear polysiloxane gum. Thus, they frequently may have varied end-blocking or termination groups, e.g., —OK, —CH$_3$,—OCH$_3$, ONa, etc. While they are essentially free of hydroxyl end-blocking as aforenoted, these useful gums contain a significant but small number of monovalent radicals attached to silicon atoms through an oxygen atom (e.g., —OK, —OCH$_3$, —ONa, etc.).

In essential respects, silicone resin (2) is a copolymer of $R_3SiO_{1/2}$ and $SiO_2$ units, where R is preferably an alkyl radical of less than 4 carbon atoms or a phenyl radical, and where the ratio of $R_3SiO_{1/2}$ to $SiO_2$ units is between about 0.7 and 0.96 inclusive. At least 90% of the total number of R radicals in this resin are preferably alkyl, methyl being by far the most common alkyl in commercially available resins of this type. As in the case of our organopolysiloxane fluid gum, the R groups of our resin may also in small part be selected from a variety of other monovalent organic radicals (e.g., such R groups as those optionally present in the gum) without upsetting the desired characteristics of the resin in its performance in our product. A small content of $R_2SiO$ units, where R is as above defined in connection with gum (1), may also be included in the structure of this resin.

The fluid gum and resin are maintained in a certain critical ratio relationship in our compositions. Based on 100 parts total for the fluid gum (1) and resin (2) mixture, the gum (1) content must account for between about 60 and 80 parts and the resin (2) content between about 40 and 20 parts. In other words, the ratio of gum to resin in the composition varies from 1.5 to 4. Outside of such limits, loss of required properties takes place. For example, if more than about 40 parts of resin (2) are employed with 60 parts of gum (1), the mixture tends to increase in viscosity, loses its easy workability; and difficulty in uniformly blending the catalyst in the mixture is encountered. Also, the resulting composition gives structural products having unreliable expansion properties, a tendency toward excessive variation in pore sizes (usually large ones), a tendency toward surface tackiness, poor elasticity, a tendency toward brittleness, and frequently a poor resistance to high temperature aging. Less than 20 parts of resin in a mixture containing 80 parts of gum gives compositions which tend to collapse on foaming, exhibit poor adhesion to substrates, an on-uniformity of pore sizes; and the resulting foam structure exhibits poor strength. A particularly surprising part of our discovery, therefore, is that silicone resins of the type here employed my a be used in a balanced composition as here taught to impart to the end cured product a toughness and strength heretofore associated only with cured products of high molecular weight silicone gum with a fume silica filler. That the resin in our composition could serve as a reinforcing agent was a totally unexpected and surprising discovery.

The optimum (or the preferred) combination of properties is exhibited by systems containing, for every 100 parts of gum and resin mixture, between 62 and 70 parts of gum and between 30 and 38 parts of resin. These compositions are liquid and easily poured into place for foaming and curing. The solid resin component does not upset the desired low viscosity of the compositions. They foam at room temperature and cure also at room temperature to give closed cell structures. Resulting structures are tough, elastic and resilient within a useful temperature range of at least 600° F. (between about minus 100° F. to plus 500° F.). As final foamed structural products, they even can be bounced, without shattering, on a concrete floor immediately after being withdrawn from a bath of liquid nitrogen. They have desirable electrical insulation properties and exhibit high resistance to degradative attack by water, various chemicals such as most dilute acids, bases, etc., and many solvents, e.g., acetone, methyl ethyl ketone, alcohols, etc.

The silanic hydrogen (3) requirement for our compositions is satisfied by the addition of an organosilicon compound having silanic hydrogen groups, e.g., usually by the addition of between about 1 and 10 parts of a hydrogen-bearing siloxane of the formula

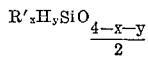

where R' is a monovalent organic radical (preferably one which offers little or no steric hindrance to removal of silanic hydrogen from its silicon atom bond), and $x$ and $y$ both have average values from 1 to 2 inclusive, the sum of $x$ and $y$ being not greater than about 3. (The average value of $y$, however, may be as low as about 0.2 so long as the weight requirement for silanic hydrogen, as aforediscussed, is satisfied in the composition.) At least 85% of the monovalent organic radicals in this compound are methyl, with any of the remainder suitably being any of a wide variety of organic radicals such as aforementioned in connection with fluid gum (1). A preferred operable silanic hydrogen compound is methyl hydrogen siloxane, with or without units such as ethyl hydrogen siloxane, butyl hydrogen siloxane, phenyl hydrogen siloxane, dimethyl siloxane, diphenyl siloxane, methyl vinyl siloxane, etc. If desired, silanic hydrogen groups on other silicone or organosilicon materials essential in our composition (e.g., silanic hydrogen on the chain of the fluid gum (1), or in the structure of resin (2)) may be relied upon and utilized in accomplishing foaming of our composition. Organosilicon materials (or silicones) other than those essential in our composition may be provided with silanic hydrogen groups and employed in our composition to satisfy the silanic hydrogen requirement. The weight of hydrogen present as silanic hydrogen in our composition must be between about 0.017 and 0.17 part per every 100 parts total of gum (1) and resin (2), such being the equivalent of employing about 1 to 10 parts of methyl hydrogen siloxane.

As the basic vulcanization catalyst which promotes room temperature severance of silanic hydrogen from its attachment to a silicon atom of a siloxane chain (or its attachment to a silicon atom of an organosilicon compound or silicone material), and thereby creates a reactive site on the silicon atom for cross-linking as well as a hydrogen gas for expansion or blowing purposes, we have surprisingly found such materials as basic metal salts of carboxylic acids to be particularly effective in our system, e.g., lead octoate, tin octoate, dibutyl tin dilaurate, tin, lead, zinc or cobalt naphthanates, etc. These basic heavy metal salts of various carboxylic acids are useful and serve to cause rapid and uniform foaming. They do not interfere with the attainment of tough, strong, age-resistant foamed structures which can withstand lengthy exposure to high temperatures (e.g., 400° F.) without discoloration or degradation. The catalytic agent should be present in the range of about 0.1 to 2 parts by weight for every 100 parts of the gum-resin mixture. Insofar as we are aware, the function of basic metal salts of carboxylic acids in the manner tought herein, i.e., to effect a large amount of uniform foaming of our balanced compositions, without interference with other desired properties, is an entirely new and unexpected discovery. These catalysts throw silanic hydrogen off the polysiloxane or other organosilicon carrying the same and thereby create a site on the organosilicon available for cross-linking. They also effect curing of certain siloxanes, as previously known. A slight exotherm is noted while the foaming and curing of the composition takes place.

The addition of organic silicates to our basic formulation offers some advantages with respect to the ultimate toughness and firmness exhibited by foamed structures formed from the composition. Suitable organic silicates for this purpose are monomeric and polymeric silicates in which the organic radicals, whether substituted or unsubstituted, saturated or unsaturated, contain preferably no more than about six carbon atoms. Some illustrative silicates are tetraethyl orthosilicate, monomeric methyl triethoxy silane, partially condensed tetraethoxy orthosilicate, isopropyl polysilicate, methyl polysilicate, ethyl polysilicate, propyl polysilicate, butyl polysilicate, amyl polysilicate, etc. These organic silicates may be devolatilized prior to use, e.g., by heating them up to about 500° F., and should be either liquid or soluble in benzene. A preferred readily available organic silicate to employ is partially condensed tetraethoxy orthosilicate.

Fillers such as fume silica, titanium dioxide, zinc oxide, calcium carbonate, carbon black, iron oxide, barium zirconate, zirconium silicate, ground quartz, etc., may be added to the composition in an amount up to about 20 parts by weight for every 100 parts of the gum-resin mixture. They frequently tend to improve the strength and high temperature aging resistance of foamed structures formed using the composition, but should not be used in excess where they create interference with fluidity or the attainment of desired porosity of foamed structure.

In addition, colorants, pigments, modifiers (such as a small amount, e.g., up to about 20 parts based on the weight of the gum-resin mix, of silicone gums having a viscosity greater than 50,000 cps.), peroxide catalysts to improve cured or vulcanized properties of the foam, etc., may all be added to our composition so long as its essential characteristics as aforedelineated are not upset.

The following examples are offered to illustrate our invention but are not to be construed as limitative of the scope thereof.

*Example 1*

In 62.5 parts of a diorganopolysiloxane gum having a viscosity of about 12,000 cps. at 25° C. was mixed and dissolved 37.5 parts of a solid silicone resin with the aid of about 19 parts toluene to aid in achieving solution. The toluene was evaporated at 150° F. for 4 hours at 20 mm. Hg, leaving a clear fluid of about 25,000 cps. viscosity at 25° C.

The gum employed was a dimethyl polysiloxane essentially free of hydroxy end-blocking, but having end-blocking groups of —OK, and having about 7.5% methyl phenyl groups. The silicone resin was prepared from sodium silicate neturalized with hydrochloric acid and reacted with hexamethyl disiloxane and trimethyl chlorosilane. The silicone resin product, after washing and drying, was a tack-free, colorless solid having a ratio of $(CH_3)_3SiO_{1/2}$ to $SiO_2$ units of about 0.8.

*Example 2*

Five parts of methyl hydrogen polysiloxane ("DC-1107" of Dow Corning) was mixed with the resin-gum mixture of Example 1, and gave a resulting mixture having a viscosity of 22,000 cps. at 25° C. One part of lead octoate was then added and stirred thoroughly into the mixture. Immediately upon adding the lead octoate, the mixture began to autogenously foam and cure at room temperature, but it remained fluid and workable for about 15 minutes. As soon as the lead octoate was mixed in, the mixture was poured into a cylindrical open mold. It increased in volume about three times, and after 24 hours at room temperature was converted to a firm, elastic, tough, closed-cell foam of uniform cellular structure with a density of about 22 pounds per cubic foot. During foaming and curing, the composition developed strong adhesion to the aluminum metal of the cylindrical mold, but after 24 hours, it was non-tacky on its exposed surface.

In a separate test, this mixture was placed in a mold having low adhesion surfaces coated with a layer of polytetrafluoroethylene. Stripped from this mold after foaming and curing, the resulting structural foam was placed in liquid nitrogen for 15 minutes, and then withdrawn and immediately thrown upon a concrete floor. It bounced from the floor without cracking or shattering. Such demonstrates the unusual resiliency of our foamed structures under extreme cold, and points to their suitability for use in aircraft and missile construction where vibrations and other forces causing shattering, cracking and the like of non-resilient or brittle silicone foams has been a heretofore unsolved problem.

*Example 3*

| | Parts by weight |
|---|---|
| Gum-resin mixture of Example 1 | 100 |
| Methyl hydrogen polysiloxane ("DC–1107") | 5 |
| Partially condensed, liquid tetraethoxy orthosilicate ("Ethyl silicate 40") | 1 |
| Dibutyl tin dilaurate | 1 |

The first three ingredients were mixed together and gave a fluid mixture of 20,000 cps. viscosity at 25° C. Then the dibutyl tin dilaurate was mixed in and the material poured into an open mold. It foamed and gelled in about 2 hours at room temperature. After 24 hours it was converted to a tough, elastic, firm foam of a density of about 20 pounds per cubic foot.

*Example 4*

The ingredients and process of Example 3 were used except that the ethyl polysilicate was omitted. The resulting foam article was slightly softer and more elastic than the foam structure of Example 3.

*Example 5*

| | Parts by weight |
|---|---|
| Gum-resin mixture of Example 1 | 100 |
| Fluid dimethyl siloxane gum of about 12,000 centipoises containing about 15% by weight of silica filler | 20 |
| Methyl hydrogen polysiloxane | 5 |
| Partially condensed, liquid tetraethoxy orthosilicate ("Ethyl silicate 40") | 1 |
| Lead octoate | 0.5 |

The first four ingredients were mixed together and gave a fluid mixture of about 40,000 cps. at 25° C. The lead octoate was then thoroughly stirred in. The workable time (pot life) of the mixture after mixing in the catalyst was one hour. The system foamed and gelled in 1 hour and 15 minutes at room temperature after mixing in the catalyst. After 5 hours, the foamed structure was tack-free; and after 24 hours at room temperature, the resulting foam was firm, strong, tough, resilient, and essentially fully vulcanized. Its density was about 25 pounds per cubic foot.

In marketing our compositions, it is convenient to package them in two-part flexible packages preferably formed of transparent heat-sealable films, for example, a polyethylene coated polyethylene terephthalate film. In one compartment or part of such package, essentially all components other than the catalyst and an optional small amount of the diorganopolysiloxane fluid gum is sealed; and in the other compartment, temporarily separated from the first compartment by a rupturable barrier seal (e.g., a heat-seal), the catalyst with or without a small portion of fluid gum may be sealed. Such an article can easily be handled in commerce. At the point of use, consumers can readily rupture or break the barrier seal between the compartments by squeezing the contents of one of the compartments thereby joining the compartments of the package together. After breaking the temporary barrier, the consumer quickly kneads the ingredients of the compartments together, while they are within the package, and then quickly cuts a hole in the package for pouring the ingredients into position where a shock-absorbing, flexible, resilient, tough, well-bonded foam is desired. All this can be accomplished without expensive molding apparatus and without the need for applying external heat.

That which is claimed is:

1. A fluid, low-viscosity siloxane composition which autogenously foams and cures at room temperature on the addition of a basic vulcanization catalyst, exhibiting high tack and adhesive properties during such autogenous action to provide a resulting heat- and cold-resistant, flexible, tough, resilient, tack-free, foamed structural product, said fluid composition comprising a mixture of (1) between 60 and 80 parts of a diorganopolysiloxane fluid gum essentially free of hydroxyl termination, having a viscosity of between 1,000 and 50,000 cps. at 25° C., and having the general formula $$R_nSiO_{\frac{4-n}{2}}$$

where R is a monovalent organic radical, at least 85% of said radicals being methyl, and $n$ has an average value of 1.9 to 2.1, and (2) between 40 and 20 parts of a benzene-soluble silicone resin composed essentially of $R_3SiO_{1/2}$ units and $SiO_2$ units, where R is a monovalent organic radical, at least 90% of said radicals being methyl, and where the ratio of $R_3SiO_{1/2}$ units to $SiO_2$ units in said resin is between about 0.7 and 0.96 inclusive, said composition additionally including, for every 100 parts of said mixture, (3) sufficient methyl hydrogen polysiloxane to provide between 0.017 and 0.17 part by weight of silanic hydrogen, any organic radicals other than methyl in said methyl hydrogen polysiloxane being those which offer substantially no steric hindrance to removal of silanic hydrogen from its silicon atom bond in said methyl hydrogen polysiloxane, said composition being foamed and cured at room temperature on the addition of between 0.1 to 2 parts by weight of a basic vulcanization catalyst active to split off silanic hydrogen from its attachment to a silicon atom of said methyl hydrogen polysiloxane.

2. A siloxane structural foam comprising the room-temperature foamed and cured product obtained by adding the basic vulcanization catalyst defined in claim 1 to the composition defined in claim 1.

3. As a new article of manufacture: a flexible package having at least two filled compartments with a rupturable barrier between said compartments serving to separate the contents of said compartments from each other during storage and shipment, said barrier being easily ruptured so as to permit kneading and mixing of the contents of said compartments at time of use, the compartments of said package being filled with ingredients which on mixing satisfy the compositional requirements of claim 1, the said basic vulcanization catalyst defined in claim 1 being in one of said compartments separated from essentially all of the ingredients of said composition of claim 1 by said rupturable barrier.

4. A method of preparing a siloxane structural foam comprising blending (a) between 0.1 and 2 parts of a basic vulcanization catalyst with (b) 100 parts of a mixture of (i) 60 to 80 parts of a diorganopolysiloxane fluid gum essentially free of hydroxyl termination, having a viscosity of between 1,000 and 50,000 cps. at 25° C., and having the general formula $$R_nSiO_{\frac{4-n}{2}}$$

wherein R is a monovalent organic radical, at least 85% of said radicals being methyl, and $n$ has an average value of 1.9 to 2.1, and (ii) 20 to 40 parts of a benzene-soluble silicone resin composed essentially of $R_3SiO_{1/2}$ units and $SiO_2$ units, where R is a monovalent organic radical, at least 90% of said radicals being methyl, and where the ratio of $R_3SiO_{1/2}$ to $SiO_2$ units in said resin is between about 0.7 and 0.96, inclusive, and (c) sufficient methyl hydrogen polysiloxane to provide between about 0.017 and 0.17 part by weight of silanic hydrogen for every 100 parts total of said gum (i) and resin (ii) mixture, any organic radicals other than methyl in said methyl hydrogen polysiloxane being those which offer substantially no steric hindrance to removal of silanic hydrogen from its silicon atom bond in said methyl hydrogen polysiloxane, said basic vulcanization catalyst being active to split off silanic hydrogen from its attachment to a silicon atom of said methyl hydrogen polysiloxane, where foaming and curing of the blend autogenously occurs at room temperature to provide a resulting heat- and cold-resistant flexible, tough, resilient, tack-free structural foam.

5. A fluid, low-viscosity siloxane composition which autogenously foams and cures at room temperature on the addition of a basic vulcanization catalyst, exhibiting high tack and adhesive properties during such autogenous action, to provide a resulting heat- and cold-resistant, flexible, tough, resilient, tack-free, foamed structural product, said fluid composition comprising a mixture of (1) between 62 and 70 parts of a diorganopolysiloxane fluid gum essentially free of hydroxyl termination, having a viscosity of between 1,000 and 50,000 cps. at 25° C., and having the general formula $$R_nSiO_{\frac{4-n}{2}}$$

where R is a monovalent organic radical, at least 85% of said radicals being methyl, and $n$ has an average value of 1.9 to 2.1, and (2) between 38 and 30 parts of a benzene-soluble silicone resin composed essentially of $R_3SiO_{1/2}$ units and $SiO_2$ units, where R is a monovalent organic radical, at least 90% of said radicals being methyl, and where the ratio of $R_3SiO_{1/2}$ units to $SiO_2$ units in said resin is between about 0.7 and 0.96, inclusive, said composition additionally including, for every 100 parts of said mixture, (3) sufficient methyl hydrogen polysiloxane to provide between 0.017 and 0.17 part by weight of silanic hydrogen, any organic radicals other than methyl in said methyl hydrogen polysiloxane being those which offer substantially no steric hindrance to removal of silanic hydrogen from its silicon atom bond in said methyl hydrogen polysiloxane, said composition being foamed and cured at room temperature on the addition of between 0.1 and 2 parts by weight of a basic vulcanization catalyst active to split off silanic hydrogen from its attachment to a silicon atom of said methyl hydrogen polysiloxane.

6. The composition of claim 5 containing in addition, up to about 5 parts of organic silicate for every 100 parts of gum and resin mixture.

7. A siloxane structural foam comprising the room-temperature foamed and cured product obtained by adding the basic vulcanization catalyst defined in claim 5 to the composition defined in claim 5.

8. As a new article of manufacture: a flexible package having at least two filled compartments with a rupturable barrier between said compartments serving to separate the contents of said compartments from each other during storage and shipment, said barrier being easily ruptured so as to permit kneading and mixing of the contents of said compartments at time of use, the compartments of said package being filled with ingredients which on mixing satisfy the compositional requirements of claim 5, the said basic vulcanization catalyst defined in claim 5 being in one of said compartments separated from essentially all of the ingredients of said composition of claim 5 by said rupturable barrier.

No references cited.

SAMUEL H. BLECH, *Primary Examiner.*
MORTON FOELAK, *Assistant Examiner.*